(12) United States Patent
Li et al.

(10) Patent No.: US 11,252,752 B2
(45) Date of Patent: Feb. 15, 2022

(54) INFORMATION FEEDBACK METHOD AND APPARATUS

(71) Applicant: HUAWEI TECHNOLOGIES CO., LTD., Guangdong (CN)

(72) Inventors: Mingchao Li, Beijing (CN); Zhenzhen Cao, Beijing (CN); Xiao Xiao, Beijing (CN); Hang Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 132 days.

(21) Appl. No.: 16/567,821

(22) Filed: Sep. 11, 2019

(65) Prior Publication Data

US 2020/0008234 A1 Jan. 2, 2020

Related U.S. Application Data

(63) Continuation of application No. PCT/CN2017/082051, filed on Apr. 26, 2017.

(51) Int. Cl.
*H04W 72/12* (2009.01)
*H04W 4/40* (2018.01)
(Continued)

(52) U.S. Cl.
CPC ......... *H04W 72/1289* (2013.01); *H04W 4/40* (2018.02); *H04W 72/044* (2013.01); *H04W 92/18* (2013.01)

(58) Field of Classification Search
CPC .............. H04W 72/1289; H04W 4/40; H04W 72/044; H04W 92/18; H04W 76/14
See application file for complete search history.

(56) References Cited

U.S. PATENT DOCUMENTS 8,756,470 B2 6/2014 Park et al.
9,455,918 B1 9/2016 Revah et al.
(Continued)

FOREIGN PATENT DOCUMENTS

CN 104125039 A 10/2014
CN 104486049 A 4/2015
(Continued)

OTHER PUBLICATIONS

Extended European Search Report issued in European Application No. 17907952.0 dated Dec. 20, 2019, 9 pages.
(Continued)

*Primary Examiner* — Charles C Jiang
*Assistant Examiner* — Shawn D Miller
(74) *Attorney, Agent, or Firm* — Fish & Richardson P.C.

(57) ABSTRACT

Embodiments of this application provide an information feedback method which performed by a transmitting end, the method includes: obtaining a direct link transmission resource; sending first direct communication data to a receiving end by using the direct link transmission resource, where the first direct communication data carries feedback indication information and sending manner indication information, the feedback indication information is used to indicate whether a receiving feedback needs to be performed for the first direct communication data, and the sending manner indication information is used to indicate that a manner of sending the first direct communication data is at least one of unicast, multicast, or broadcast; when the feedback indication information indicates that a feedback needs to be performed for the first direct communication data, receiving second direct communication data sent by the receiving end on a direct link feedback resource, where the second direct communication data carries feedback information.

20 Claims, 4 Drawing Sheets

(51) Int. Cl.
*H04W 72/04* (2009.01)
*H04W 92/18* (2009.01)

(56) References Cited

U.S. PATENT DOCUMENTS

| | | |
|---|---|---|
| 2015/0163821 A1 | 6/2015 | Wu |
| 2016/0066337 A1 | 3/2016 | Sartori et al. |
| 2016/0105878 A1 | 4/2016 | Zhao et al. |
| 2016/0135143 A1 | 5/2016 | Won et al. |
| 2017/0188391 A1* | 6/2017 | Rajagopal ......... H04W 74/0816 |
| 2017/0201461 A1* | 7/2017 | Cheng ..................... H04L 43/16 |
| 2017/0231023 A1 | 8/2017 | Adachi |
| 2017/0347394 A1 | 11/2017 | Yasukawa et al. |
| 2018/0152914 A1 | 5/2018 | Wang et al. |

FOREIGN PATENT DOCUMENTS

| | | |
|---|---|---|
| CN | 105409287 A | 3/2016 |
| JP | 2018509050 A | 3/2018 |
| RU | 2566557 C1 | 10/2015 |
| WO | 2016021644 A1 | 2/2016 |
| WO | 2016076301 A1 | 5/2016 |
| WO | 2016122163 A1 | 8/2016 |

OTHER PUBLICATIONS

PCT International Search Report and Written Opinion issued in International Application No. PCT/CN2017/082051 dated Jan. 19, 2018, 19 pages (with English translation).

Office Action issued in Japanese Application No. 2019-541357 dated Sep. 29, 2020, 5 pages (with English translation).

Office Action issued in Russian Application No. 2019129476/07(058040) dated Sep. 28, 2020, 21 pages (with English translation).

\* cited by examiner

INFORMATION FEEDBACK METHOD AND APPARATUS

CROSS-REFERENCE TO RELATED DISCLOSURES

This application is a continuation of International Application No. PCT/CN2017/082051, filed on Apr. 26, 2017. The disclosure of which is hereby incorporated by reference in its entirety.

TECHNICAL FIELD

The present disclosure relates to the communications field, and in particular, to an information feedback method and an apparatus.

BACKGROUND

As society constantly develops, automobiles are increasingly popularized. Driving inflicts negative impacts on human society to some extent while making traveling convenient. Rapid increase of vehicles causes a series of problems such as city traffic jam, frequent traffic accidents, and environment deterioration. In view of a plurality of aspects such as personal safety, transportation and traveling efficiency, environment protection, and economic effects, an improved intelligent transportation system (ITS) is required.

Currently, a vehicle may obtain road condition information or receive an information service promptly through vehicle to vehicle (V2V) communication, or vehicle to infrastructure (V2I) communication, or vehicle to pedestrian (V2P) communication, or vehicle to network (V2N) communication. These communication manners may be collectively referred to as V2X communication (where X indicates any object). The commonest V2V and V2I are used as an example. When performing V2V communication, a vehicle may broadcast information such as a speed of the vehicle, a driving direction, a specific location, and whether an emergency brake is stepped on to surrounding vehicles. A driver can better sense a traffic status beyond a line of sight by obtaining these types of information, to determine and avoid a danger in advance. In V2I communication, in addition to the foregoing safety information exchange, infrastructure may further provide various service information and data network access to a vehicle, and functions such as electronic toll collection and in-vehicle entertainment all greatly improve traffic intelligence. A network used in V2X communication is referred to as Internet of vehicles.

A Vehicle platooning scenario is a typical user scenario in V2X, and means that a plurality of vehicles are platooned to form a vehicle platoon and a relatively small distance is maintained between vehicles by exchanging control information and data information. A head vehicle in the platoon is referred to as a head node of the vehicle platoon. The head node is responsible for controlling a speed, a direction, and the like of the entire vehicle platoon, and the head node sends information to other vehicles to control close platooning and running of the entire vehicle platoon. The other vehicles in the platoon also need to share information such as their locations, orientations, statuses, and acceleration and deceleration intentions, that is, send V2X information to surrounding vehicles. A vehicle platooning technology can effectively reduce energy consumption. In addition, other vehicles other than the head vehicle in the vehicle platoon may be self-driven or driven assisted by a person, and this can effectively reduce manpower costs. Because there is a relatively small distance between the vehicles in the vehicle platoon, to avoid a collision, requirements on V2X information transmission frequency and reliability are very high.

SUMMARY

Embodiments of the present disclosure provide an information feedback method and an apparatus, to improve direct link transmission reliability and enable resource scheduling to be more flexible.

According to a first aspect, an embodiment of the present disclosure provides an information feedback method, including: obtaining, by a transmitting end, a direct link transmission resource; sending, by the transmitting end, first direct communication data to a receiving end by using the direct link transmission resource, where the first direct communication data carries feedback indication information and sending manner indication information, the feedback indication information is used to indicate whether a receiving feedback needs to be performed for the first direct communication data, and the sending manner indication information is used to indicate that a manner of sending the first direct communication data is at least one of unicast, multicast, or broadcast; and when the feedback indication information indicates that a feedback needs to be performed for the first direct communication data, receiving, by the transmitting end, second direct communication data sent by the receiving end on a direct link feedback resource, where the second direct communication data carries feedback information.

In this embodiment of this application, the transmitting end obtains the direct link transmission resource from the network device, and sends the first direct communication data by using the transmission resource. The first direct communication data carries a transmission feedback indication, so that when a feedback is required, the receiving end sends, on the direct link feedback resource obtained by the transmitting end or the receiving end, the second direct communication data carrying the feedback information. Therefore, the feedback improves transmission reliability.

In a possible implementation of the first aspect, the first direct communication data includes first control information and a first media access control protocol data unit that is encapsulated with service data, and the feedback indication information and/or the sending manner indication information is carried in the first media access control protocol data unit or the first control information.

In a possible implementation of the first aspect, the second direct communication data includes second control information and/or a second media access control protocol data unit, and the feedback information is carried in the second media access control protocol data unit or the second control information.

In a possible implementation of the first aspect, the first direct communication data further carries a first identifier used to identify a current group of the transmitting end, and the first identifier is carried in the media access control protocol data unit or the control information.

In a possible implementation of the first aspect, the method further includes: obtaining, by the transmitting end, the direct link feedback resource.

In a possible implementation of the first aspect, the obtaining, by the transmitting end, the direct link feedback resource is in one of the following manners: obtaining, by the transmitting end, the direct link feedback resource based on system information or dedicated radio resource control signaling received from a network device; obtaining, by the transmitting end, the direct link feedback resource by receiving scheduling signaling sent by the network device on a physical downlink control channel; obtaining, by the transmitting end through autonomous selection, the direct link feedback resource from a direct link feedback resource pool configured or preconfigured by the network device; and obtaining, by the transmitting end, the direct link feedback resource based on the direct link transmission resource and a preset mapping relationship between the direct link transmission resource and the direct link feedback resource.

In a possible implementation of the first aspect, the first direct communication data further carries feedback resource indication information, used to indicate a time frequency resource of the direct link feedback resource.

In a possible implementation of the first aspect, the first direct communication data further carries a second identifier, the second identifier is an identifier of the transmitting end or an identifier of the first direct communication data, and the feedback information includes the second identifier.

According to a second aspect, this application provides an information feedback method, including: receiving, by a receiving end, first direct communication data sent by a transmitting end by using a direct link transmission resource, where the first direct communication data carries feedback indication information and sending manner indication information, the feedback indication information is used to indicate whether a receiving feedback needs to be performed for the first direct communication data, and the sending manner indication information is used to indicate that a manner of sending the first direct communication data is at least one of unicast, multicast, or broadcast; and when the feedback indication information indicates that a feedback needs to be performed for the first direct communication data, sending, by the receiving end, second direct communication data to the transmitting end on a direct link feedback resource, where the second direct communication data carries feedback information.

In a possible implementation of the second aspect, the method further includes: obtaining, by the receiving end, the direct link feedback resource.

Optionally, the obtaining, by the receiving end, the direct link feedback resource is in one of the following manners: obtaining, by the receiving end, the direct link feedback resource by receiving system information or dedicated radio resource control signaling from a network device; obtaining, by the receiving end, the direct link feedback resource by receiving scheduling signaling sent by the network device on a physical downlink control channel; obtaining, by the receiving end through autonomous selection, the direct link feedback resource from a direct link feedback resource pool configured or preconfigured by the network device; obtaining, by the receiving end, the direct link feedback resource based on the direct link transmission resource and a preset mapping relationship between the direct link transmission resource and the direct link feedback resource; and obtaining, by the receiving end, the direct link feedback resource based on feedback resource indication information carried in the first direct communication data, where the feedback resource indication information is used to indicate a time frequency resource of the direct link feedback resource.

According to a third aspect, this application provides an information feedback method, including: generating, by a network device, configuration information of a direct link feedback resource, where the direct link feedback resource is used by a receiving end to send second direct communication data after the receiving end receives first direct communication data, the second direct communication data carries feedback information, the first direct communication data carries feedback indication information and sending manner indication information, the feedback indication information is used to indicate whether a receiving feedback needs to be performed for the first direct communication data, and the sending manner indication information is used to indicate that a manner of sending the first direct communication data is at least one of unicast, multicast, or broadcast; and sending, by the network device, the configuration information of the direct link feedback resource to the receiving end or a transmitting end.

In a possible implementation of the third aspect, the sending, by the network device, the configuration information of the direct link feedback resource to the receiving end or a transmitting end further includes: sending, by the network device, the configuration information of the direct link feedback resource to the receiving end or the transmitting end by using system information or dedicated radio resource control signaling; or sending, by the network device, the configuration information of the direct link feedback resource to the receiving end or the transmitting end on a physical downlink control channel.

According to a fourth aspect, this application provides a transmitting end. The transmitting end has a function of performing actions of the transmitting end in the foregoing method implementation. The function may be implemented by hardware, or may be implemented by hardware executing corresponding software. The hardware or software includes one or more modules corresponding to the foregoing function.

According to a fifth aspect, this application provides a receiving end. The receiving end has a function of performing actions of the receiving end in the foregoing method implementation. The function may be implemented by hardware, or may be implemented by hardware executing corresponding software. The hardware or software includes one or more modules corresponding to the foregoing function.

According to a sixth aspect, this application provides a network device. The network device has a function of performing actions of the network device in the foregoing method implementation. The function may be implemented by hardware, or may be implemented by hardware executing corresponding software. The hardware or software includes one or more modules corresponding to the foregoing function.

According to a seventh aspect, this application provides a computer-readable storage medium, configured to store a computer software instruction used by the data transmitting end or the receiving end or the network device, where the computer software instruction includes a program designed to perform the foregoing aspects.

Compared with the prior art, this application provides an information feedback method and an apparatus. Direct communication data carries the transmission feedback indication, so that when a feedback is required, the receiving end sends the feedback information on the direct link feedback resource, thereby improving transmission reliability.

DESCRIPTION OF EMBODIMENTS

A terminal device mentioned in the embodiments of the present disclosure may be a device that provides a user with voice and/or data connectivity, a handheld device with a radio connection function, or another processing device connected to a radio modem. A wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, and a personal digital assistant (PDA). The wireless terminal may be referred to as a system, a subscriber unit, a subscriber station, a mobile station, a mobile, a remote station, an access point, a remote terminal, an access terminal, a user terminal, a user agent, a user device, or user equipment.

A network device (for example, an access point) in the embodiments of the present disclosure may be a device that communicates with a wireless terminal by using one or more sectors at an air interface in an access network. The network device may be configured to perform mutual conversion between a received over-the-air frame and an IP packet and serve as a router between the wireless terminal and a rest portion of the access network, where the rest portion of the access network may include an Internet protocol (IP) network. The network device may coordinate attribute management of the air interface. For example, the network device may be a base transceiver station (BTS) in GSM or CDMA, may be a NodeB in WCDMA, or may be an evolved NodeB (eNB, or e-NodeB) in the LTE, which is not limited in this application.

Figure 1A:
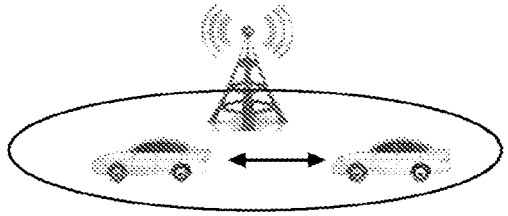
FIG. 1A and FIG. 1B are a schematic architectural diagram of a direct communication service according to an embodiment of the present disclosure.
Figure 1B:
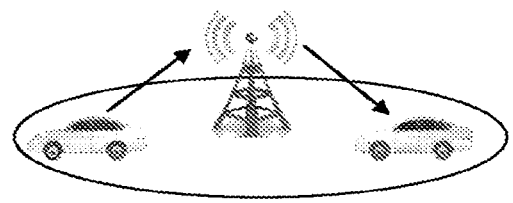

Currently, LTE is a mainstream wireless communications technology and may be used to bear a direct communication service. Direct communication includes but is not limited to V2X. A direct communication message may be sent through forwarding by a network device or may be sent by a terminal in a direct communication manner. A communication manner in which a terminal directly communicates with a terminal without using a network device is referred to as direct communication. For example, FIG. 1A and FIG. 1B are a schematic architectural diagram of a direct communication service. FIG. 1A is a schematic architectural diagram of transmitting a direct communication message by a terminal in a direct communication manner. FIG. 1B is a schematic architectural diagram of transmitting a direct communication message through forwarding by a network device.

Although this application is described by using a V2X service in an LTE system as an example, a person skilled in the art should know that this application is not only applicable to the V2X service in the LTE system but also applicable to another direct communication service.

In the prior art, in the direct communication manner used by the terminal, as shown in FIG. 1A, a transmission resource obtained by a terminal may be allocated by a network device, or may be autonomously selected from a transmission resource pool. In an autonomous selection manner, the terminal pre-obtains configuration information of the transmission resource pool that may be used to transmit data. When generating data, the terminal needs to autonomously select a resource from the transmission resource pool for sending. Regardless of whether the network device allocates a transmission resource, or the terminal autonomously selects a transmission resource from the transmission resource pool, the terminal sends a V2X message in a broadcast manner by using the obtained transmission resource, and retransmits a same V2X message twice at most.

Because of the broadcast manner and a limited quantity of retransmissions, reliability cannot be ensured. Particularly, in the autonomous selection manner, when a plurality of neighboring terminals select a same resource from a transmission resource pool to send data, a transmission collision occurs, and a collision rate increases as a user quantity or a service density increases. In a high-density service scenario, a transmission collision has a strong impact on system performance, and reliability decreases as a service density increases. As a result, a transmission requirement of a V2X service such as vehicle platooning having a relatively high reliability requirement cannot be satisfied.

Figure 2:
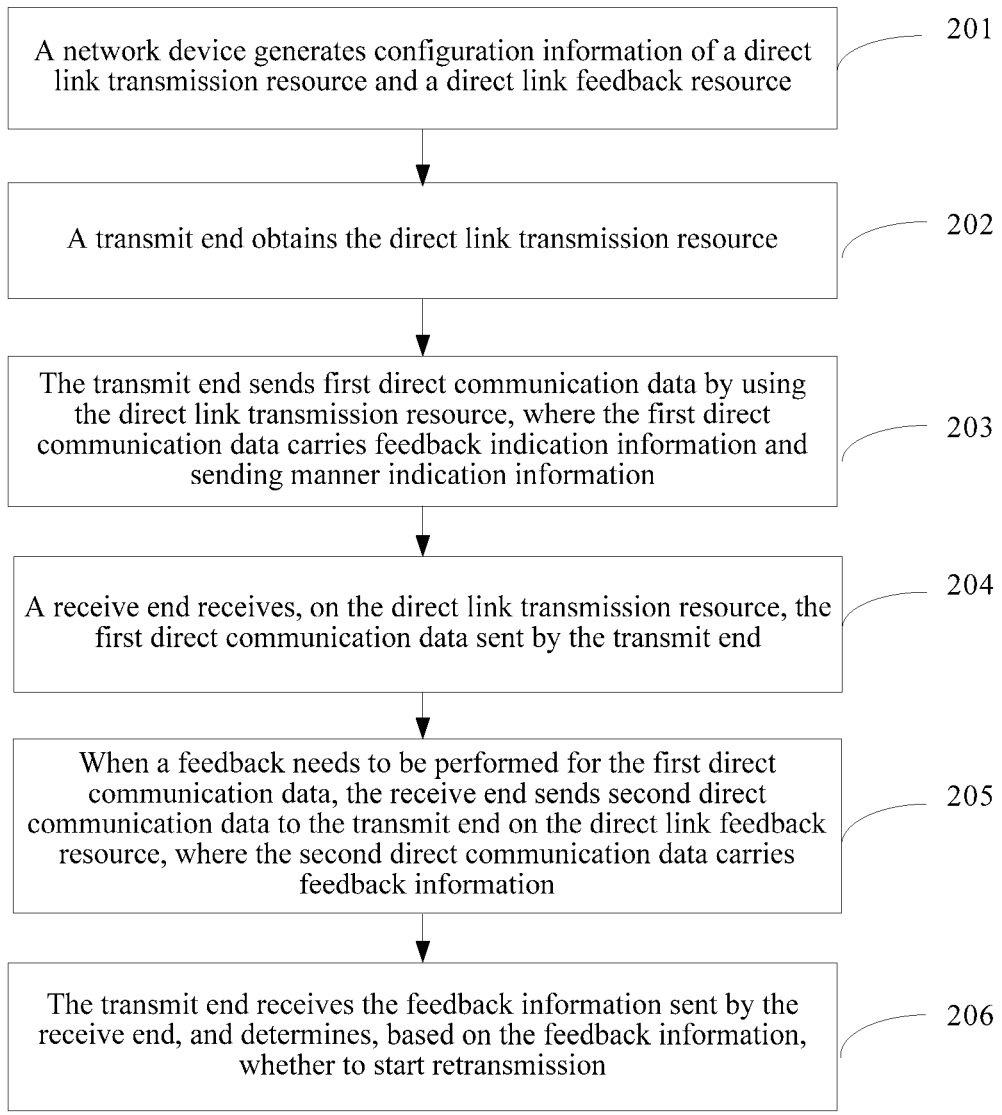
FIG. 2 is a flowchart of a data transmission method according to an embodiment of the present disclosure.

To resolve the foregoing technical problem, according to an aspect, an embodiment of the present disclosure provides an information feedback method. As shown in FIG. 2, the information feedback method may be applied to the network architecture shown in FIG. 1A. As shown in FIG. 1A, a vehicle on the left may be a transmitting end and a vehicle on the right may be a receiving end; or a vehicle on the left may be a receiving end and a vehicle on the right may be a transmitting end. The method includes the following steps.

Step 201: A network device generates configuration information of a direct link transmission resource and a direct link feedback resource.

The direct link transmission resource is used to transfer first direct communication data (for example, V2X data), and the direct link feedback resource is used to receive second direct communication data sent by a terminal after the terminal receives the first direct communication data. The second direct communication data carries feedback information. The direct link transmission resource includes a data transmission resource and a control information transmission resource. The data transmission resource is used to transmit service data of direct communication data; and the control information transmission resource is used to transmit direct link control information of the direct communication data. The direct link control information includes information such as a time-frequency resource location of a data transmission resource and a corresponding modulation and coding scheme.

Optionally, the first direct communication data includes first control information and a first media access control protocol data unit that is encapsulated with service data. The second direct communication data includes second control information and/or a second media access control protocol data unit.

Step 202: A transmitting end obtains the direct link transmission resource.

Optionally, the transmitting end may obtain the direct link transmission resource through dynamic allocation or semi-static allocation by the network device. Before the network device allocates the direct link transmission resource to the transmitting end, the transmitting end may send resource scheduling request information or traffic characterization information to the network device, so that the network device allocates the direct link transmission resource to the transmitting end based on the resource scheduling request information or the traffic characterization information.

Optionally, the transmitting end may obtain the direct link transmission resource from a pre-obtained transmission resource pool. The transmitting end may obtain the transmission resource pool by receiving dedicated radio resource control (RRC) information or system information (for example, system information block (SIB) broadcast information) of the network device, or may obtain the transmission resource pool by using preconfigured information.

Step 203: The transmitting end sends the first direct communication data by using the direct link transmission resource, where the first direct communication data carries feedback indication information and sending manner indication information.

The feedback indication information is used to indicate whether a receiving feedback needs to be performed for the first direct communication data. For example, the feedback indication information may be 1-bit indication information. When a value is 1, it indicates that the receiving end needs to send, after receiving the first direct communication data, the second direct communication data carrying the feedback information, to indicate whether the first direct communication data is correctly received. When the value is 0, it indicates that the receiving end does not need to send a feedback after receiving the first direct communication data. Optionally, the feedback indication information is carried in the first control information or the first MAC PDU that is encapsulated with direct communication service data.

The sending manner indication information is used to indicate that the first direct communication data is sent in at least one manner of unicast, multicast, or broadcast. Optionally, the sending manner indication information is also carried in the first control information or the first MAC PDU that is encapsulated with direct communication service data, for example, carried in a header of the first MAC PDU. Optionally, when the sending manner indication information indicates that the unicast manner is used for sending, the transmitting end needs to add an address of a target receiving end to the first MAC PDU or the first control information.

Optionally, the first direct communication data further carries a group identifier, and the receiving end receives the first direct communication data based on the sending manner indication information and the group identifier. The group identifier is used to indicate a group of the first direct communication data currently sent. For example, a group identifier 1 indicates that the first direct communication data is from a vehicle platoon group 1. Optionally, the group identifier is carried in the first control information or the first MAC PDU that is encapsulated with direct communication service data. The group identifier may be carried in a header of the first MAC PDU or may be carried in a valid payload of the first MAC PDU.

In this embodiment of this application, a method of combining the sending manner indication information and the group identifier is used, so that direct communication data is sent and fed back in a more targeted manner, and direct link data transmission is more efficiently completed.

Optionally, the first direct communication data further carries feedback resource indication information, used to indicate a time frequency resource of the direct link feedback resource used by the receiving end to send the feedback information after the receiving end receives the first direct communication data.

Optionally, the transmitting end may alternatively send a message separately, to notify the receiving end of the time frequency resource of the direct link feedback resource used by the receiving end to send the feedback information after the receiving end receives the first direct communication data. The present disclosure is not limited thereto, and details are not described herein.

Step 204: The receiving end receives, on the direct link transmission resource, the first direct communication data sent by the transmitting end.

Specifically, the receiving end receives, on a first control resource of the direct link transmission resource, the first control information sent by the transmitting end, and receives direct communication service data based on a time-frequency resource location of the direct link feedback resource that is indicated in the first control information.

Optionally, the receiving end determines, based on the group identifier, whether the group of the transmitting end is a group that the receiving end is interested in, and the receiving end processes only first direct communication data sent by the group that the receiving end is interested in. For example, the receiving end processes only the first direct communication data from a vehicle platoon of the receiving end.

Step 205: When a feedback needs to be performed for the first direct communication data, the receiving end sends the second direct communication data to the transmitting end on the direct link feedback resource, where the second direct communication data carries feedback information.

Optionally, the second direct communication data includes second control information and/or a second media access control protocol data unit, and the feedback information is carried in the second media access control protocol data unit or the second control information.

When the feedback indication information indicates that the first direct communication data needs to be fed back, the receiving end needs to send the second direct communication data on the direct link feedback resource for feeding back. The receiving end needs to obtain the direct link feedback resource to send the second direct communication data. Optionally, the direct link feedback resource may be obtained in the following several manners.

In a first manner, the transmitting end obtains the direct link feedback resource, and notifies the receiving end of location information of the direct link feedback resource by using the feedback resource indication information carried in the first direct communication data.

Optionally, the transmitting end obtains the direct link feedback resource in the following several manners.

(1) The transmitting end obtains the direct link feedback resource by receiving system information or dedicated RRC signaling from the network device.

Specifically, the transmitting end may send feedback resource request information to the network device. The network device allocates the direct link feedback resource to the transmitting end based on the feedback resource request information, and notifies the transmitting end of the direct link feedback resource by using a SIB or dedicated RRC signaling; or the network device may directly allocate a feedback resource to the transmitting end by using a SIB or dedicated RRC signaling.

(2) The transmitting end obtains the direct link feedback resource by receiving scheduling signaling sent by the network device on a physical downlink control channel.

(3) The transmitting end obtains, through autonomous selection, the direct link feedback resource from a direct link feedback resource pool configured or preconfigured by the network device.

Specifically, the transmitting end may obtain the feedback resource pool through preconfiguration or storage. The transmitting end may obtain the feedback resource pool by receiving a SIB or dedicated RRC signaling from the network device.

In a second manner, the receiving end obtains the direct link feedback resource.

Because the direct link feedback resource is not obtained by the transmitting end, the first direct communication data sent by the transmitting end does not carry the feedback resource indication information.

Optionally, the receiving end obtains the direct link feedback resource in the following several manners.

(1) The receiving end obtains the direct link feedback resource by receiving system information or dedicated RRC signaling from the network device.

Specifically, the receiving end may send feedback resource request information to the network device. The network device allocates the direct link feedback resource to the receiving end based on the feedback resource request information, and notifies the receiving end of the direct link feedback resource by using a SIB or dedicated RRC signaling; or the network device may directly allocate a feedback resource to the receiving end by using a SIB or dedicated RRC signaling.

(2) The receiving end obtains the direct link feedback resource by receiving scheduling signaling sent by the network device on a physical downlink control channel.

(3) The receiving end obtains, through autonomous selection, the direct link feedback resource from a direct link feedback resource pool configured or preconfigured by the network device.

Specifically, the receiving end may obtain the feedback resource pool through preconfiguration or storage. The receiving end may obtain the feedback resource pool by receiving a SIB or dedicated RRC signaling from the network device.

(4) The receiving end obtains the direct link feedback resource based on the direct link transmission resource and a preset mapping relationship between the direct link transmission resource and the direct link feedback resource.

In this manner, the time-frequency resource location of the direct link feedback resource is fixed, and the receiving end may directly deduce the location of the direct link feedback resource by using the time frequency resource of the direct link transmission resource. For example, if there is a unique mapping relationship between a feedback resource and the control information transmission resource, the receiving end determines the feedback resource location based on a location of the control information transmission resource used by the transmitting end and the unique mapping relationship between the feedback resource and the control information transmission resource. For another example, if there may alternatively be a many-to-one relationship between a feedback resource and the control information transmission resource, the receiving end selects a time frequency resource as a used direct link feedback resource from a plurality of feedback resources corresponding to the control information transmission resource. There may also be a mapping relationship between the direct link feedback resource and the direct link transmission resource. Optionally, in this manner, the transmitting end may alternatively obtain the direct link feedback resource based on the direct link transmission resource and a preset mapping relationship between the direct link transmission resource and the direct link feedback resource.

Optionally, because the transmitting end cannot learn of whether a feedback resource used by the receiving end is used for the sent first direct communication data, the transmitting end further requires the receiving end to add an identifier to the feedback information of the second direct communication data, to identify the first direct communication data corresponding to the feedback information. The identifier may be an identifier of the transmitting end or an identifier of the first direct communication data. Optionally, the identifier of the transmitting end or the identifier of the first direct communication data may be carried in the sent first direct communication data, and the receiving end obtains the identifier of the transmitting end or the identifier of the first direct communication data from the received first direct communication data.

When determining, based on the feedback indication information, that a feedback is required, the receiving end sends the second direct communication data on the corresponding direct link feedback resource, where the second direct communication data carries the feedback information. Specifically, if both control information and service data are correctly received, an ACK is fed back; otherwise, a NACK is fed back.

As described above, the direct link feedback resource is obtained in a plurality of manners, and based on different manners, the receiving end sends ACK/NACK feedback information in the following several manners:

In a first manner, the transmitting end notifies the receiving end of the location information of the direct link feedback resource by using the feedback resource indication information carried in the first direct communication data, and the receiving end determines the location of the direct link feedback resource based on the time-frequency resource location indicated in the feedback resource indication information, and sends the feedback information on the direct link feedback resource.

In a second manner, the receiving end may directly deduce the location of the direct link feedback resource by using the time frequency resource of the direct link transmission resource, and send the feedback information on the corresponding direct link feedback resource.

In a third manner; after obtaining the direct link feedback resource allocated by the network device, the receiving end sends the feedback information on the corresponding feedback resource; or after obtaining the direct link feedback resource from a feedback resource pool, the receiving end sends the feedback information on the corresponding feedback resource.

Optionally, step 206: The transmitting end receives the feedback information sent by the receiving end, and determines, based on the feedback information, whether to start retransmission.

In this embodiment of this application, the transmitting end obtains the direct link transmission resource from the network device, and sends the first direct communication data by using the transmission resource. The first direct communication data carries a transmission feedback indication, so that when a feedback is required, the receiving end sends, on the direct link feedback resource obtained by the transmitting end or the receiving end, the second direct communication data carrying the feedback information, thereby improving transmission reliability. In addition, in this embodiment of this application, the first direct communication data carries the group identifier and the sending manner indication information, so that the transmitting end indicates, to the receiving end in a group in a more targeted manner based on a specified sending manner (for example, unicast and multicast), whether a feedback needs to be sent. Therefore, the transmitting end may determine, based on the feedback information, whether the receiving end in the corresponding group correctly receives data. In this way, group division and sending manners are more flexible, resource scheduling is more convenient, and transmission reliability is further improved.

Figure 3:
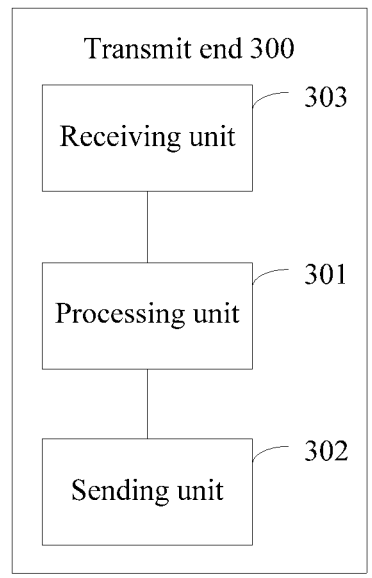
FIG. 3 is a schematic structural diagram of a transmitting end according to an embodiment of the present disclosure.

Referring to FIG. 3, an embodiment of this application provides a transmitting end 300. The transmitting end 300 includes:

a processing unit 301, configured to obtain a direct link transmission resource;

a sending unit 302, configured to send first direct communication data (for example, V2X data) to a receiving end by using the direct link transmission resource, where the first direct communication data carries feedback indication information and sending manner indication information, the feedback indication information is used to indicate whether a receiving feedback needs to be performed for the first direct communication data, and the sending manner indication information is used to indicate that a manner of sending the first direct communication data is at least one of unicast, multicast, or broadcast; and a receiving unit 303, configured to, when the feedback indication information indicates that a feedback needs to be performed for the first direct communication data, receive second direct communication data sent by the receiving end on a direct link feedback resource, where the second direct communication data carries feedback information.

Optionally, the first direct communication data includes first control information and a first media access control protocol data unit that is encapsulated with service data, and the feedback indication information and/or the sending manner indication information is carried in the first media access control protocol data unit or the first control information. The second direct communication data includes second control information and/or a second media access control protocol data unit, and the feedback information is carried in the second media access control protocol data unit or the second control information.

Optionally, the first direct communication data further carries a group identifier, used to identify a current group of the transmitting end 300, and the group identifier is carried in the first media access control protocol data unit or the first control information.

In a possible implementation, the processing unit is further configured to obtain the direct link feedback resource.

Optionally, the processing unit is further configured to: obtain the direct link feedback resource by receiving system information or dedicated radio resource control signaling from a network device by using the receiving unit; obtain the direct link feedback resource by receiving, by using the receiving unit, scheduling signaling sent by a network device on a physical downlink control channel; obtain, through autonomous selection, the direct link feedback resource from a direct link feedback resource pool configured or preconfigured by a network device; or obtain the direct link feedback resource based on the direct link transmission resource and a preset mapping relationship between the direct link transmission resource and the direct link feedback resource.

Optionally, the direct communication data further carries feedback resource indication information, used to indicate a time frequency resource of the direct link feedback resource. Optionally, the transmitting end may alternatively send a message separately, to notify the receiving end of the time frequency resource of the direct link feedback resource used by the receiving end to send the feedback information after the receiving end receives the first direct communication data. The present disclosure is not limited thereto, and details are not described herein.

Optionally, the first direct communication data further carries an identifier, the identifier is an identifier of the transmitting end or an identifier of the first direct communication data, and the feedback information includes the identifier.

Figure 4:
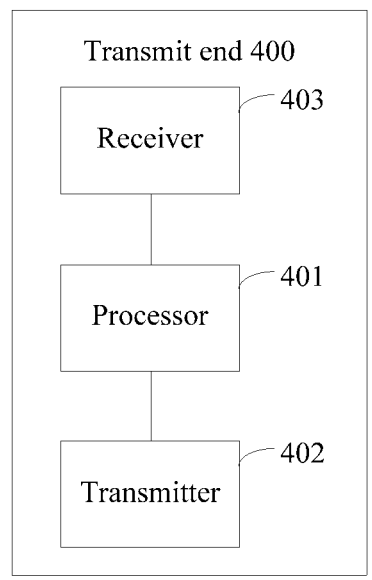
FIG. 4 is a schematic structural diagram of another transmitting end according to an embodiment of the present disclosure.

It should be noted that the transmitting end 300 provided in this embodiment of this application may perform the actions of the transmitting end in the foregoing method embodiment. The sending unit 302 is configured to perform the sending action of the transmitting end in the foregoing method embodiment, the processing unit 301 is configured to perform the processing actions such as obtaining and determining in the foregoing method embodiment, and the receiving unit 303 is configured to perform the receiving action of the transmitting end in the foregoing method embodiment. The sending unit 302 and the receiving unit 303 may also be combined as a transceiver unit. In a physical implementation, the sending unit 302 may be a transmitter, the processing unit 301 may be a processor, the receiving unit 303 may be a receiver, and the transmitter and the receiver may also be combined as a transceiver. As shown in FIG. 4, a transmitting end 400 includes a processor 401, a transmitter 402, and a receiver 403. The processor 401, the transmitter 402, and the receiver 403 are connected by using various electronic line interfaces (for example, buses).

In this embodiment of this application, the transmitting end obtains the direct link transmission resource from the network device, and sends the first direct communication data by using the transmission resource. The first direct communication data carries a transmission feedback indication, so that when a feedback is required, the receiving end sends, on the obtained direct link feedback resource, the second direct communication data carrying the feedback information, thereby improving transmission reliability. In addition, in this embodiment of this application, the direct communication data carries the group identifier and the sending manner indication information, so that the transmitting end indicates, to the receiving end in a group in a more targeted manner based on a specified sending manner (for example, unicast and multicast), whether a feedback needs to be sent. In this way, group division and sending manners are more flexible, resource scheduling is more convenient, and transmission reliability is further improved.

Figure 5:
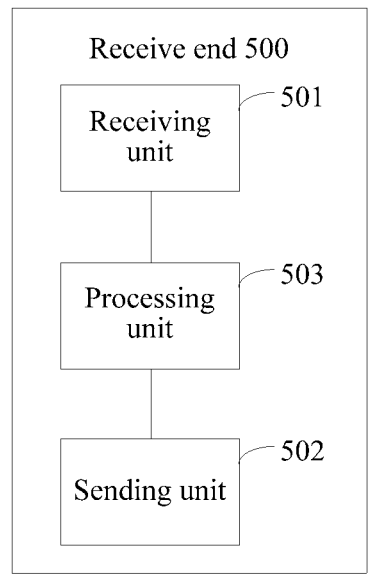
FIG. 5 is a schematic structural diagram of a receiving end according to an embodiment of the present disclosure.

Referring to FIG. 5, an embodiment of this application provides a receiving end 500, including:

a receiving unit 501, configured to receive first direct communication data (for example, V2X data) sent by a transmitting end by using a direct link transmission resource, where the first direct communication data carries feedback indication information and sending manner indication information, the feedback indication information is used to indicate whether a receiving feedback needs to be performed for the first direct communication data, and the sending manner indication information is used to indicate that a manner of sending the first direct communication data is at least one of unicast, multicast, or broadcast; and a sending unit 502, configured to, when the feedback indication information indicates that a feedback needs to be performed for the direct communication data, send second direct communication data to the transmitting end on a direct link feedback resource, where the second direct communication data carries feedback information.

For content related to and information carried in the first direct communication data and the second direct communication data, refer to the foregoing content. Details are not described herein.

In a possible implementation, the receiving end further includes a processing unit 503 configured to obtain the direct link feedback resource.

Optionally, the processing unit is further configured to: obtain the direct link feedback resource by receiving system information or dedicated radio resource control signaling from a network device by using the receiving unit; obtain the direct link feedback resource by receiving, by using the receiving unit, scheduling signaling sent by a network device on a physical downlink control channel; obtain, through autonomous selection, the direct link feedback resource from a direct link feedback resource pool configured or preconfigured by a network device; obtain the direct link feedback resource based on the direct link transmission resource and a preset mapping relationship between the direct link transmission resource and the direct link feedback resource; or obtain the direct link feedback resource based on feedback resource indication information carried in the first direct communication data, where the feedback resource indication information is used to indicate a time frequency resource of the direct link feedback resource.

Figure 6:
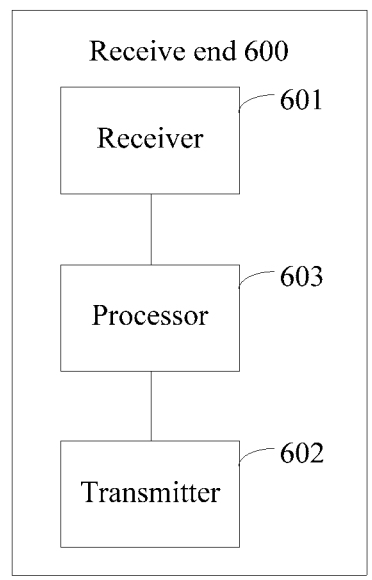
FIG. 6 is a schematic structural diagram of another receiving end according to an embodiment of the present disclosure.

It should be noted that the receiving end 500 provided in this embodiment of this application may perform the actions of the receiving end in the foregoing method embodiment. The sending unit 502 is configured to perform the sending action of the receiving end in the foregoing method embodiment, the processing unit 503 is configured to perform the processing actions such as obtaining and determining in the foregoing method embodiment, and the receiving unit 501 is configured to perform the receiving action of the receiving end in the foregoing method embodiment. The sending unit 502 and the receiving unit 501 may also be combined as a transceiver unit. In a physical implementation, the sending unit 502 may be a transmitter, the processing unit 503 may be a processor, the receiving unit 501 may be a receiver, and the transmitter and the receiver may also be combined as a transceiver. As shown in FIG. 6, a receiving end 600 includes a processor 603, a transmitter 602, and a receiver 601. The processor 603, the transmitter 602, and the receiver 601 are connected by using various electronic line interfaces (for example, buses).

In this embodiment of this application, the receiving end receives the first direct communication data sent by the transmitting end on the direct link transmission resource, so that when a feedback is required, the receiving end sends the feedback information on the obtained direct link feedback resource, thereby improving transmission reliability. In addition, in this embodiment of this application, the first direct communication data carries a group identifier and the sending manner indication information, so that the receiving end correctly receives data in a group in a more targeted manner based on a specified sending manner (for example, unicast and multicast). In this way, group division and sending manners are more flexible, resource scheduling is more convenient, and transmission reliability is further improved.

Figure 7:
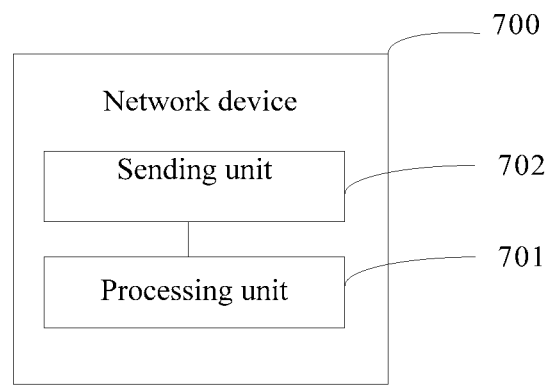
FIG. 7 is a schematic structural diagram of a network device according to an embodiment of the present disclosure.

Referring to FIG. 7, an embodiment of this application provides a network device 700, including:

a processing unit 701, configured to generate configuration information of a direct link feedback resource, where the direct link feedback resource is used by a receiving end to send second direct communication data after the receiving end receives first direct communication data, the second direct communication data carries feedback information, the first direct communication data carries feedback indication information and sending manner indication information, the feedback indication information is used to indicate whether a receiving feedback needs to be performed for the first direct communication data, and the sending manner indication information is used to indicate that a manner of sending the first direct communication data is at least one of unicast, multicast, or broadcast; and a sending unit 702, configured to send the configuration information of the direct link feedback resource to the receiving end or the transmitting end.

For content related to and information carried in the first direct communication data and the second direct communication data, refer to the foregoing content. Details are not described herein.

In a possible implementation, the sending unit is further configured to send the configuration information of the direct link feedback resource to the receiving end or the transmitting end by using system information or dedicated radio resource control signaling; or the sending unit is further configured to send the configuration information of the direct link feedback resource to the receiving end or the transmitting end on a physical downlink control channel.

Figure 8:
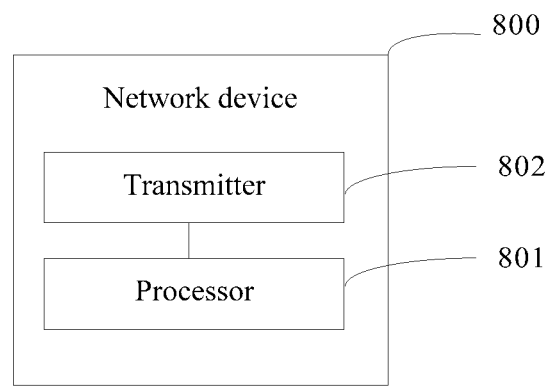
FIG. 8 is a schematic structural diagram of another network device according to an embodiment of the present disclosure.

It should be noted that the network device 700 provided in this embodiment of this application may perform the actions of the network device in the foregoing method embodiment. The sending unit 702 is configured to perform the sending action of the transmitting end in the foregoing method embodiment, and the processing unit 701 is configured to perform the processing actions such as obtaining and determining in the foregoing method embodiment. In a physical implementation, the sending unit 702 may be a transmitter, and the processing unit 701 may be a processor. As shown in FIG. 8, a network device 800 includes a processor 801 and a transmitter 802. The processor 801 and the transmitter 802 are connected by using various electronic line interfaces (for example, buses).

In this embodiment of this application, the network device configures the direct link transmission resource and the feedback resource, and the transmitting end sends the first direct communication data by using the direct link transmission resource. The direct communication data carries the transmission feedback indication, so that when a feedback is required, the receiving end sends, on the obtained direct link feedback resource, the second direct communication data carrying the feedback information. Therefore, the feedback improves transmission reliability.

All or some of the foregoing embodiments may be implemented by software, hardware, firmware, or any combination thereof. When the software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing descriptions are merely example embodiments of this application, but are not intended to limit this application. Any modification, equivalent replacement, or improvement made without departing from the spirit and principle of this application should fall within the protection scope of this application.

What is claimed is:

1. A transmitting end, wherein the transmitting end comprises:
   a processor; and
   a non-transitory computer-readable storage medium storing a program to be executed by the processor, the program including instructions to:
   obtain a direct link transmission resource;
   send first direct communication data to a receiving end by using the direct link transmission resource, wherein the first direct communication data carries feedback indication information and sending manner indication information, the feedback indication information indicates whether a receiving feedback is to be performed for the first direct communication data, and the sending manner indication information indicates that a manner of sending the first direct communication data is at least one of unicast, multicast, or broadcast, wherein both the transmitting end and the receiving end are terminals, and the direct link transmission resource is a resource used for a transmission between terminals; and
   when the feedback indication information indicates that a feedback is to be performed for the first direct communication data, receive second direct communication data sent by the receiving end on a direct link feedback resource, wherein the second direct communication data carries feedback information.

2. The transmitting end according to claim 1, wherein the first direct communication data comprises first control information and a first media access control protocol data unit that is encapsulated with service data, and at least one of the feedback indication information or the sending manner indication information is carried in the first media access control protocol data unit or the first control information.

3. The transmitting end according to claim 1, wherein the second direct communication data comprises at least one of second control information or a second media access control protocol data unit, and the feedback information is carried in the second media access control protocol data unit or the second control information.

4. The transmitting end according to claim 2, wherein the first direct communication data further carries a first identifier that identifies a current group of the transmitting end, and the first identifier is carried in the first media access control protocol data unit or the first control information.

5. The transmitting end according to claim 1, wherein the program further includes instructions to obtain the direct link feedback resource.

6. The transmitting end according to claim 5, wherein the program further including instructions to obtain the direct link feedback resource in one of the following manners:
   obtaining the direct link feedback resource by receiving system information or dedicated radio resource control signaling from a network device;
   obtaining the direct link feedback resource by receiving scheduling signaling sent by the network device on a physical downlink control channel;
   obtaining, through autonomous selection, the direct link feedback resource from a direct link feedback resource pool configured or preconfigured by the network device; or
   obtaining the direct link feedback resource based on the direct link transmission resource and a preset mapping relationship between the direct link transmission resource and the direct link feedback resource.

7. The transmitting end according to claim 1, wherein the first direct communication data further carries feedback resource indication information that indicates a time frequency resource of the direct link feedback resource.

8. The transmitting end according to claim 1, wherein the first direct communication data further carries a second identifier, the second identifier is an identifier of the transmitting end or an identifier of the first direct communication data, and the feedback information comprises the second identifier.

9. A receiving end, wherein the receiving end comprises:
   a processor; and
   a non-transitory computer-readable storage medium storing a program to be executed by the processor, the program including instructions to:
   receive first direct communication data sent by a transmitting end by using a direct link transmission resource, wherein the first direct communication data carries feedback indication information and sending manner indication information, the feedback indication information indicates whether a receiving feedback is to be performed for the first direct communication data, and the sending manner indication information indicates that a manner of sending the first direct communication data is at least one of unicast, multicast, or broadcast, wherein both the transmitting end and the receiving end are terminals, and the direct link transmission resource is a resource used for a transmission between terminals; and
   when the feedback indication information indicates that a feedback is to be performed for the first direct communication data, send second direct communication data to the transmitting end on a direct link feedback resource, wherein the second direct communication data carries feedback information.

10. The receiving end according to claim 9, wherein the first direct communication data comprises first control information and a first media access control protocol data unit that is encapsulated with service data, and at least one of the feedback indication information or the sending manner indication information is carried in the first media access control protocol data unit or the first control information.

11. The receiving end according to claim 9, wherein the second direct communication data comprises at least one of second control information or a second media access control protocol data unit, and the feedback information is carried in the second media access control protocol data unit or the second control information.

12. The receiving end according to claim 10, wherein the first direct communication data further carries a first identifier that identifies a current group of the receiving end, and the program further including the instructions to receive the first direct communication data based on the sending manner indication information and the first identifier.

13. The receiving end according to claim 12, wherein the first identifier is carried in the first media access control protocol data unit or the first control information.

14. The receiving end according to claim 9, wherein the program further including instructions to obtain the direct link feedback resource.

15. The receiving end according to claim 14, wherein the program further including instructions to obtain the direct link feedback resource in one of the following manners:
obtaining the direct link feedback resource by receiving system information or dedicated radio resource control signaling from a network device;
obtaining the direct link feedback resource by receiving scheduling signaling sent by the network device on a physical downlink control channel;
obtaining, through autonomous selection, the direct link feedback resource from a direct link feedback resource pool configured or preconfigured by the network device;
obtaining the direct link feedback resource based on the direct link transmission resource and a preset mapping relationship between the direct link transmission resource and the direct link feedback resource; or
obtaining the direct link feedback resource based on feedback resource indication information carried in the first direct communication data, wherein the feedback resource indication information is used to indicate a time frequency resource of the direct link feedback resource.

16. The receiving end according to claim 9, wherein the first direct communication data further carries a second identifier, the second identifier is an identifier of the transmitting end or an identifier of the first direct communication data, and the feedback information comprises the second identifier.

17. A network device, wherein the network device comprises:
a processor; and
a non-transitory computer-readable storage medium storing a program to be executed by the processor, the program including instructions to:
generate configuration information of a direct link feedback resource, wherein the direct link feedback resource is used by a receiving end to send second direct communication data after the receiving end receives first direct communication data, the second direct communication data carries feedback information, the first direct communication data carries feedback indication information and sending manner indication information, the feedback indication information indicates whether a receiving feedback is to be performed for the first direct communication data, and the sending manner indication information indicate that a manner of sending the first direct communication data is at least one of unicast, multicast, or broadcast; and
send the configuration information of the direct link feedback resource to the receiving end or a transmitting end, wherein both the transmitting end and the receiving end are terminals, and the direct link feedback resource is a resource used for a transmission between terminals.

18. The network device according to claim 17, wherein the first direct communication data comprises first control information and a first media access control protocol data unit that is encapsulated with service data, and at least one of the feedback indication information or the sending manner indication information is carried in the first media access control protocol data unit or the first control information.

19. The network device according to claim 17, wherein the second direct communication data comprises at least one of second control information or a second media access control protocol data unit, and the feedback information is carried in the second media access control protocol data unit or the second control information.

20. The network device according to claim 17, wherein the program further including instructions to:
send the configuration information of the direct link feedback resource to the receiving end or the transmitting end by using system information or dedicated radio resource control signaling; or
send the configuration information of the direct link feedback resource to the receiving end or the transmitting end on a physical downlink control channel.

* * * * *